United States Patent [19]

Satake et al.

[11] Patent Number: 5,178,990
[45] Date of Patent: Jan. 12, 1993

[54] METHOD OF IDENTIFYING OUTPUT, MAIN WAVELENGTH, ETC., OF LIGHT

[75] Inventors: Toshimi Satake; Tomoaki Nagai; Hiroshi Fukui; Miyuki Yokoyama; Akio Sekine, all of Tokyo, Japan

[73] Assignee: Jujo Paper Co., Ltd., Tokyo, Japan

[21] Appl. No.: 565,443

[22] Filed: Aug. 9, 1990

[30] Foreign Application Priority Data

Aug. 15, 1989 [JP] Japan ................... 1-210455

[51] Int. Cl.$^5$ ................................................. G03C 5/00
[52] U.S. Cl. .................................. 430/346; 430/338; 430/945; 430/964
[58] Field of Search ............. 430/964, 945, 946, 338; 428/913; 250/316.1, 475.2, 482.1

[56] References Cited

U.S. PATENT DOCUMENTS

| | | | |
|---|---|---|---|
| 4,412,231 | 10/1983 | Namba et al. | 430/964 |
| 4,666,819 | 5/1987 | Elmasry | 430/964 |
| 4,942,141 | 7/1990 | DeBoer et al. | 430/945 |
| 5,100,711 | 3/1992 | Satake et al. | 428/6 X |

Primary Examiner—Charles L. Bowers, Jr.
Assistant Examiner—Thorl Chea
Attorney, Agent, or Firm—Burgess, Ryan & Wayne

[57] ABSTRACT

A method of identifying the output energy, main wavelength, position, pattern, etc., of light, which comprises irradiating a photosensitive coloring medium comprising a base material, a heat-sensitive coloring material, and a light absorptive material releasing heat sufficient for coloring the heat-sensitive coloring material by absorbing the light and identifying the output energy, main wavelength, position, pattern, etc., of the light from the colored extent thereof.

6 Claims, No Drawings

5,178,990

METHOD OF IDENTIFYING OUTPUT, MAIN WAVELENGTH, ETC., OF LIGHT

FIELD OF THE INVENTION

This invention relates to a method of applying light to a photosensitive coloring medium and identifying the output energy, main wavelength, position, pattern, etc., of the light from the colored extent thereof.

The method of this invention can be advantageously utilized for the identification of the output energy, etc., of near infrared region light such as semiconductor laser light, electronic flash, etc.

BACKGROUND OF THE INVENTION

A conventional near infrared region sensor card which is used for identifying near infrared light is composed of laminated plastic sheets and a photoluminescent material dispersed as fine powders between the plastic sheets.

On receiving near infrared light, the sensor card emits visible light and shows the form of the invisible near infrared rays and the intensity of the incident light as it is. Thus, the sensor card is effective for the detection of the position of near infrared rays emitted from various kinds of lasers and LED (light emitting diode) and the identification of patterns of such near infrared rays. Also, since a photoluminescent material is used for converting near infrared rays into visible light, the sensor card has an advantage that it can be repeatedly used.

However, since the sensor utilizes the luminous phenomena of a photoluminescent material caused by the transition from an excited state thereof raised by absorbing a light energy receiving from outside, there are various inconveniences. That is, in an ordinary room light, it is required to continue the irradiation for a time as long about one minute for bringing the photoluminescent material into the excited state, and also since the luminescence is vanished with the stop of the light irradiation, photographing is required for storing the luminous pattern by the irradiated light and hence without photographing, it is impossible to identify the state of the irradiated light in detail or compare the state of the irradiation light with a state of other irradiation light.

Furthermore, a near infrared region sensor card using a photoluminescent material is expensive and an inexpensive and simply disposable near infrared region sensor card has not yet been developed.

As described above, in the conventional method of identifying near infrared light such as semiconductor laser light, there are disadvantages that it is difficult to obtain records for comparing one irradiated pattern with other irradiated pattern, it is impossible to store the records easily (or without need of photographing) for a long period of time, and also the materials being used for the method are expensive.

In particular, in the case of focusing a laser beam, it is really necessary to easily obtain the recorded image of the focused laser beam, which can safely and simply detect the shape, intensity, etc., of the focused laser spot and can compare it with other recorded images later, but such an easy means has not yet been found at present. Also, when a laser device emits plural laser beams, it is difficult to exactly know the number, shapes, and intensities of these laser beams by conventional methods.

Also, in the case of focusing plural laser beams, it is impossible to accurately determine whether the optical systems are matched well or not.

SUMMARY OF THE INVENTION

The object of this invention is, therefore, to provide a method of easily identifying the output energy, main wavelength, position, pattern, etc., of light in such a manner that the image thereof can be recorded and stored.

More particularly, the object of this invention is to provide a method of easily identifying the output energy, main wavelength, position, pattern, etc., of near infrared laser light in such a manner that the colored image thereof can be recorded and stored.

More particularly, the object of this invention is to provide a method of irradiating a photosensitive coloring medium with light and easily identifying the output energy, main wavelength, position, pattern, etc., of the light from the colored extent of the coloring medium in such a manner that the colored image thereof can be recorded and stored.

It has now been discovered that the aforesaid object can be attained by the present invention as set forth hereinbelow.

That is, according to this invention, there is provided a method of identifying the output energy, main wavelength, position, pattern, etc., of light, which comprises irradiating a photosensitive coloring medium with the light and identifying the output energy, main wavelength, position, pattern, etc., of the light from the colored extent of the coloring medium.

More specifically, the invention provides a method of identifying the output energy, main wavelength, position, pattern, etc., of light, which comprises irradiating a photosensitive coloring medium with the light, said photosensitive coloring material comprising a base material, a heat-sensitive coloring material, and a light-absorptive material releasing heat sufficient for coloring the heat-sensitive coloring material by absorbing the light, and identifying the output energy, main wavelength, position, pattern, etc., of the light from the colored extent of the coloring medium.

DETAILED DESCRIPTION OF THE INVENTION

In this invention, the photosensitive coloring medium being used comprises a base material, a heat-sensitive coloring material, and a light-absorptive material releasing heat sufficient for coloring the heat-sensitive coloring material upon absorbing light being identified.

As the base material for the photosensitive coloring medium being used in this invention, a paper, a nowoven fabric, a woven cloth, a plastic sheet, a metal plate, etc., is used. The base material may be transparent or opaque, colored or uncolored, etc., and there are not particular restrictions on the thickness, the form, etc., thereof. That is, the kind of the base material can be properly selected according to the purpose of the photosensitive coloring medium.

The heat-sensitive coloring material for use in this invention may be a combinatin of a color former and a developer or may be a color former which colors by itself. Furthermore, the heat-sensitive coloring material may contain additives such as sensitizer, etc.

Specific examples of the heat-sensitive coloring material are a heat-sensitive coloring material composed of a basic colorless dye and an organic developer, a chelate series heat-sensitive coloring material composed of a metal salt of a fatty acid and a polyhydric phenol compound, a light-fixable diazo heat-sensitive coloring material composed of a diazonium salt, a coupler, and a basic substance, and an irreversible heat-sensitive coloring material containing a metal compound.

In these materials, the heat-sensitive coloring material composed of a basic colorless dye and an organic developer is most suitable for this invention since the coloring sensitivity to heat can be easily adjusted and states of different irradiation lights can be stored by employing a multicolor heat-sensitive coloring material.

Also, the light-absorptive material for use in this invention is preferably a material absorbing maximum absorption wavelengths of from 600 to 1500 nm including a near infrared wavelength region and visible wavelength region. Specific examples of the light-absorptive material are illustrated below although the invention is not limited to them.

1. Polymethine Dye (Cyanine Dye)

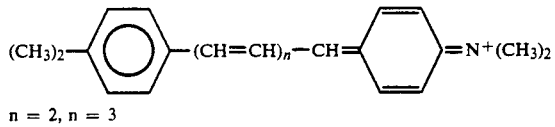

n = 2, n = 3

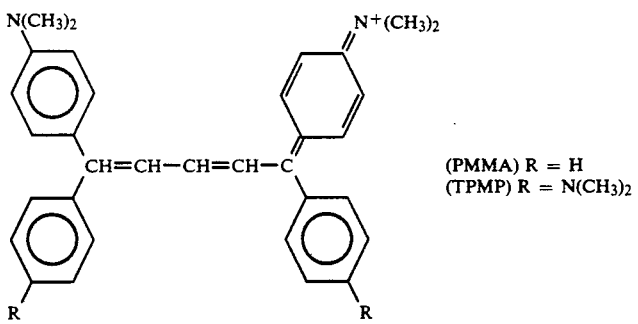

(PMMA) R = H
(TPMP) R = N(CH$_3$)$_2$

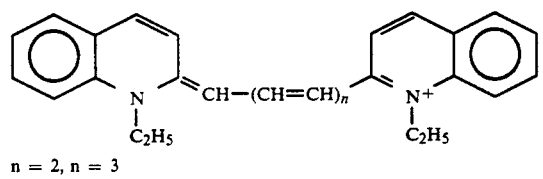

n = 2, n = 3

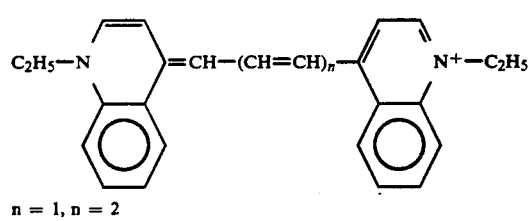

n = 1, n = 2

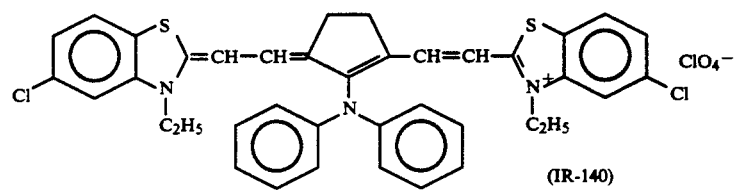

(IR-140)

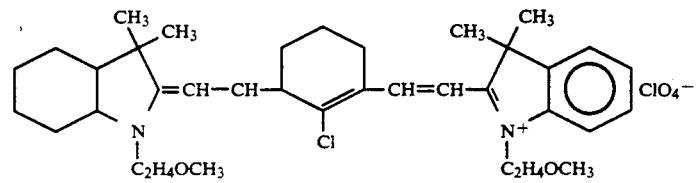

2. Azulenium Dye

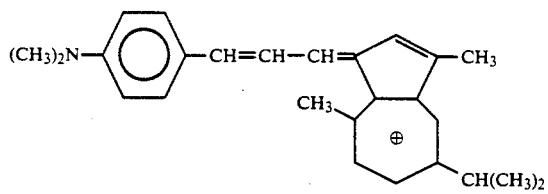
3. Pyrylium, Thiopyrylium Series Dye
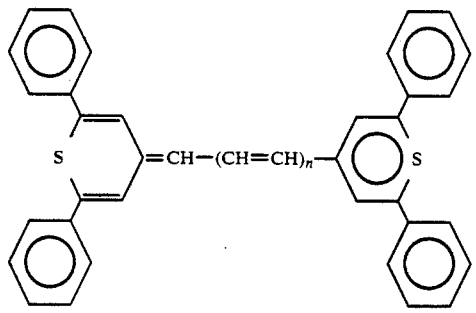
4. Squarylium Series Dye
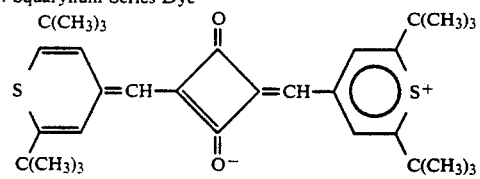
5. Croconium Series Dye
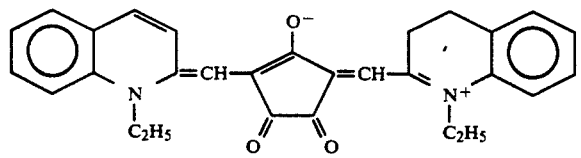
6. Thiol Nickel Complex Salt Series Dye
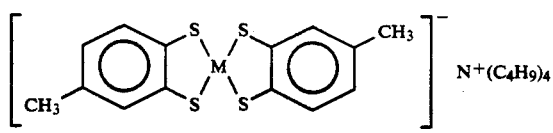
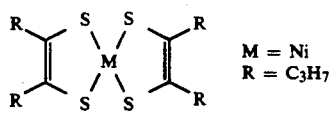
M = Ni
R = C₃H₇
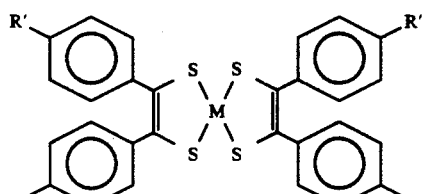
M = Ni   R' = H
M = Ni   R' = OCH₃
M = pt   R' = H
7. Mercaptophenol, Mercaptonaphthol Complex Series Dye
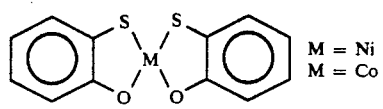
M = Ni
M = Co -continued
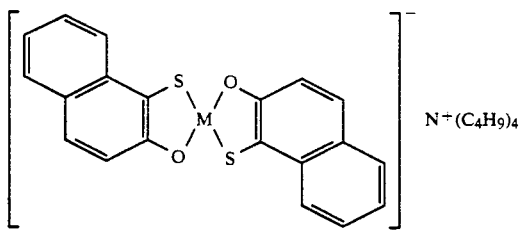
M = Ni, Co, Pt.
8. Triallylmethane Series Dye
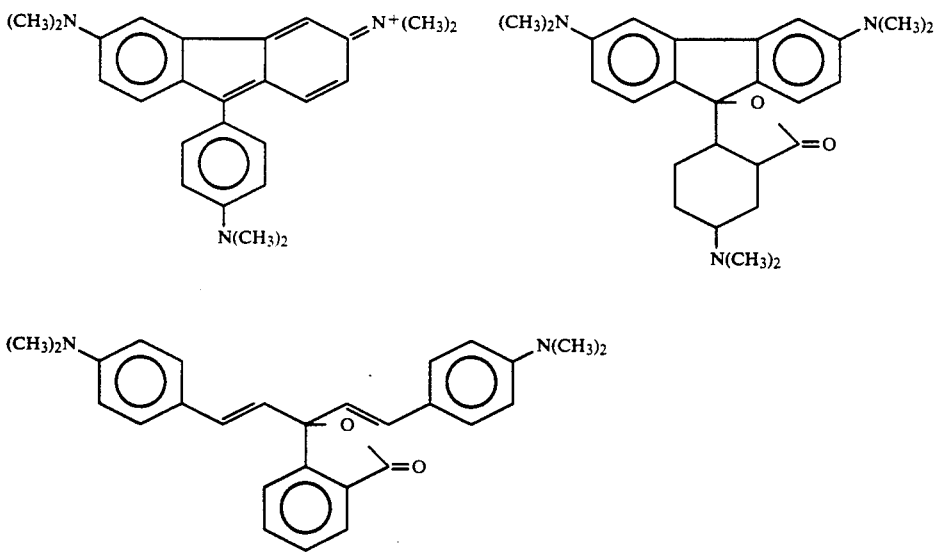
9. Immonium, Diimmonium Series Dye
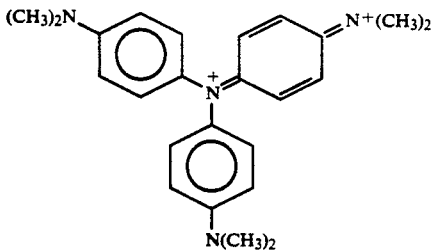
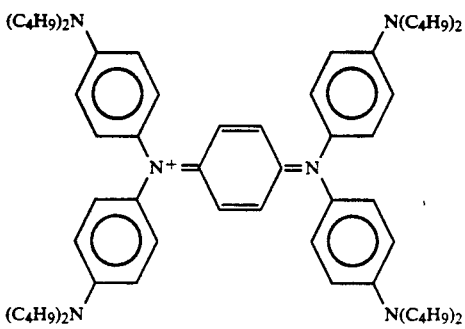
10. Anthraquinone Series Dye -continued
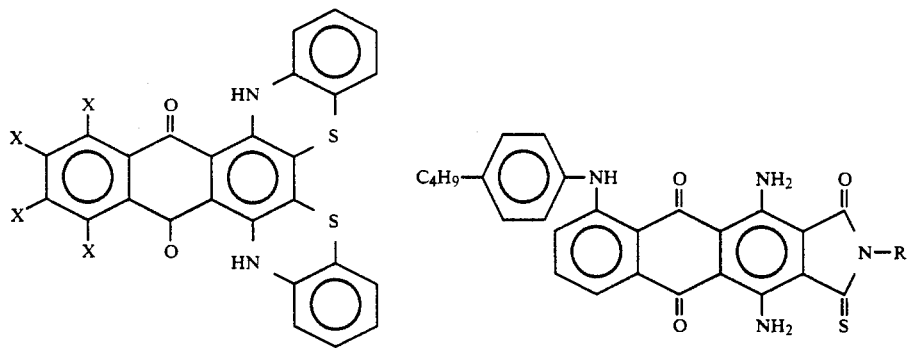
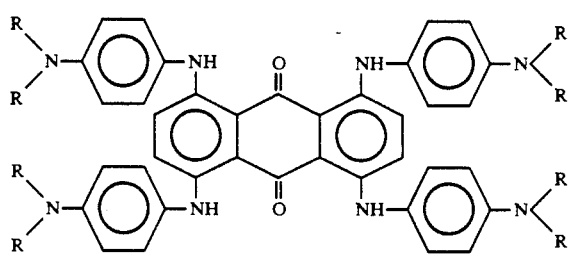
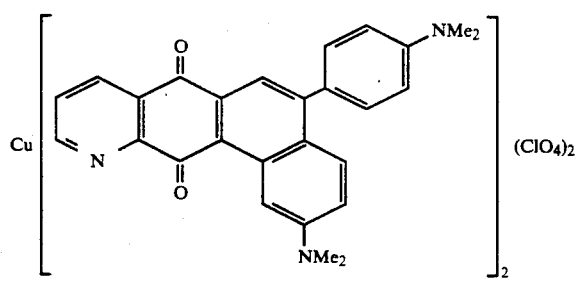
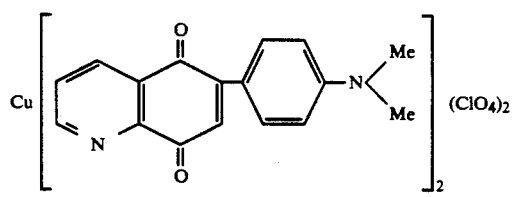
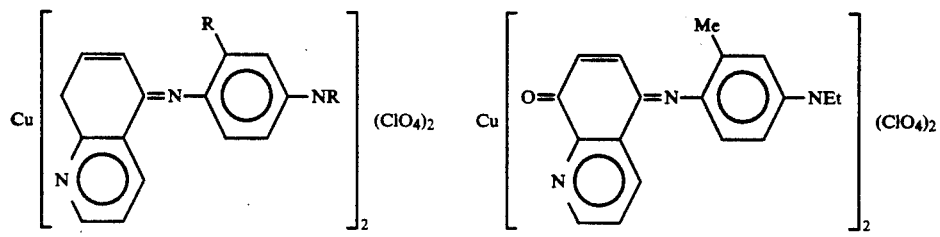
11. Metal Complex Salt Series Dye
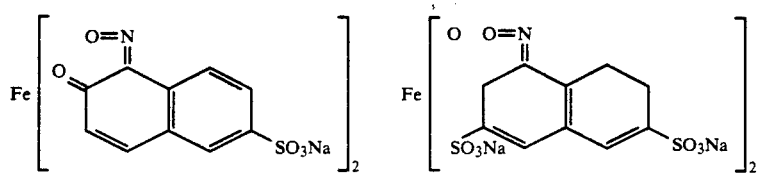

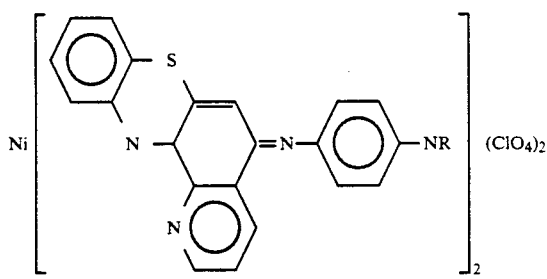

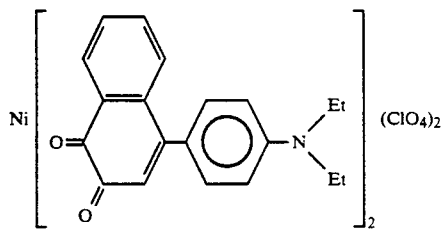

12. Water-Soluble Cyanine Dye

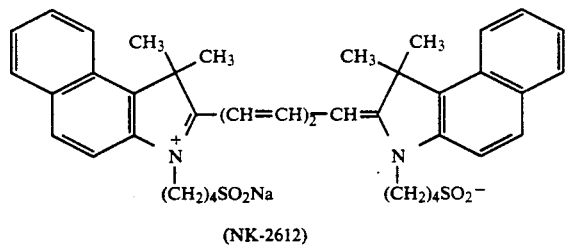

(NK-2612)

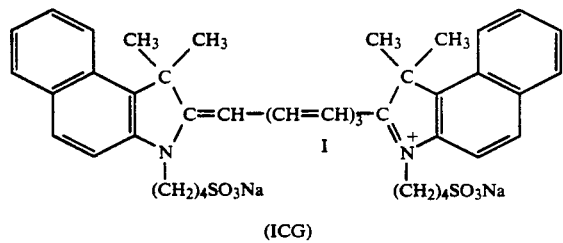

(ICG)

Also, the dyes commercially available as the following trade names, made by Nippon Kanko Shikiso Kenkyusho k.k. can be used as the light-absorptive material in this invention.

That is, there are NDL-101, NDL-102, NDL-112, NK-5, NK-78, NK-123, NK-124, NK-125, NK-126, NK-136, NK-138, NK-186, NK-427, NK-529, NK-747, NK-1144, NK-1150, NK-1456, NK-1511, NK-1590, NK-1666, NK-1747, NK-1887, NK-1967, NK-2014, NK-2204, NK-2268, NK-2409, NK-2421, NK-2627, NK-2674, NK-2929, NK-3027, NKX-113, and NKX-114.

The near infrared absorbents commercially available as the following trade names, made by Imperial Chemical Industries Limited.

That is, there are S101756, S116510, S116510/2, S109186, S109564, and S109564/2.

Also, the near infrared absorbents commercially available as the following trade names, made by Nippon Kayaku Co., Ltd.

That is, there are CY-2, CY-4, CY-9, CY-20, IR-750, IR-820, IRG-002, IRG-003, IRG-022, and IRG-023.

The addition amount of the near infrared absorbent (the light-absorptive material) is preferably as small as possible for reducing the whiteness of the photosensitive coloring medium but the amount thereof is generally required to be at least 1.5% by weight of the weight of the support (base material) or the weight of the layer formed in the support for generating heat of temperature of at least 100° C.

The photosensitive coloring material for use in this invention is composed of the aforesaid base material, heat-sensitive coloring material, and light-absorptive material.

The heat-sensitive coloring material and the light-absorptive material may be separately melted or separately dispersed or dissolved in each solvent at use.

Also, substance(s) having relatively low melting point such as a developer and/or a sensitizer in the heat-sensitive coloring material may be used in such a manner that the substance(s) are melted by heating, the light-absorptive material is dissolved or dispersed in the melt, and after cooling, the solidified mixture is finely granulated. Furthermore, in the case of using dye(s), they may be separately dispersed.

Moreover, the developer and/or the sensitizer or the dye and/or the sensitizer may be co-dispersed with the light-absorptive material at use. In this case, other components which are not co-dispersed can be separately dispersed.

When these dispersions or melts are applied to the base material, a heat-sensitive coloring material layer and a light-absorptive material layer may be successively formed on the base material, such as plural layers of a light-absorptive material layer/a heat-sensitive coloring layer/a light-absorptive material layer in this order.

Also, these dispersions may be mixed and incorporated in the base material, or they may be coated on the base material as a single layer or separate two or three layers.

Also, the incorporation in the base material and coating can be employed together and in this case, one of the dispersions is incorporated in the base material and the other thereof is coated on the base material. The dispersions may be coated on the base material as a mixture thereof.

The coating layer(s) may be previously formed on the base material using a coating means or a printer, or may be formed on the base material at use as ink(s) or coating composition(s) by ink jet or brush.

In general, when a paper is used as the base material, these dispersions may be incorporated in the paper and/or coated on the surface of the paper, when a transparent sheet is used as the base material, the dispersions may be kneaded with the sheet, inserted between the sheets, and/or coated on the surface of the sheet, and when an opaque sheet is used, the dispersions may be coated on the surface thereof.

The heat-sensitive coloring material layer and the light-absorptive layer can be formed on the base material in multilayers by an overall coating method or a partial lamination method.

In an example of the overall coating method, the heat-sensitive coloring material is coated on the base material and then a solution of a water-soluble light-absorptive material in an aqueous binder solution is coated on the whole surface of the heat-sensitive coloring material layer. In this embodiment, light sensor elements or light sensor papers having various sensitivities are obtained according to the sensitivity of the heat-sensitive coloring material and the amount of the water-soluble light-absorptive material. Also, by using the water-soluble light-absorptive material having the absorption characteristics matching with the kind of light being measured, a more accurate light sensor can be prepared.

By combining the light-absorptive material with a so-called dichromatic heat-sensitive recording paper having on the upper and lower surfaces of a paper support each of color former layers coloring at each different temperature, a sensor which can easily compare the characteristics of irradiated lights each having a different wavelength or intensity by coloring of the upper layer only, coloring of the upper layer and the lower layer, or coloring of the lower layer only caused by the light energies is obtained.

The sensitivity of the photosensitive coloring medium (light sensor) differs according to the manner of disposing the light-absorptive material adjacent to the heat-sensitive coloring material and further the contrast of the light sensor is influenced by the selection of the light-absorptive material and the manner of disposing the light-absorptive material adjacent to the heat-sensitive coloring material.

Also, in an example of the partial lamination method, the photosensitive coloring medium (light sensor) having the light-absorptive material on desired partial portions of the surface of the heat-sensitive coloring material layer formed by applying an ink containing the light-absorptive material with an ink jet system or a printing system can be obtained.

As the ink jet system being used in the aforesaid case, there are on demand systems by the methods such as a pressure pulse method, a bubble jet method, a heat-melting method, an electrolytic controlling method, etc., and other various systems such as a continuous jetting system, etc.

Also, as the printing system being used, there are a letterpress printing system, a lithographic printing system, a gravure printing system, etc.

Furthermore, the light-absorptive layer may be partially formed on the heat-sensitive coloring material layer formed on a base material using an aqueous or oily ball pen, fiber pen, ceramic pen, etc., holding an ink containing the light-absorptive material to provide a photosensitive coloring medium, which can be used as a light sensor.

Also, printing plural light-absorptive layers each having a different absorption peak on one heat-sensitive coloring material-containing layer in separate sections, plural laser beams each having different coloring wavelength characteristics can be identified by one optial sensor sheet.

It is preferred that the ink composition containing the light-absorptive material being used does not give influences on heat-sensitive recording. The amount of the light-absorptive material laminated on the heat-sensitive coloring material-containing layer depends upon the output of laser light being identified and it is generally preferred that the reflectance of the heat-absorptive material layer is lower. It is preferred that the coating amount of the light-absorptive material or the content of the light-absorptive material in a coating composition or an ink composition is controlled such that the reflectivity thereof is in the range of from 20 to 80% by utilizing that the light-absorptive material generally has a few absorption in a visible wavelength region. If the reflectance of the light-absorptive material thus coated is less than 20%, the absorption is too strong and the amount of the light-absorptive material is excessive. On the other hand, if the absorbance is over 80%, the absorption efficiency of the light-absorptive material layer is inferior to reduce the quantity of heat generated, thereby sufficient coloring is not obtained.

As the light source being identified or evaluated by the method of this invention, laser light is preferred. If the main wavelength of the light source is in the near infrared wavelength region of from 600 nm to 1500 nm and the output thereof is in the range of from 5 mW to 200 mW, the light can be identified or evaluated by the method of this invention.

In the case of semiconductor laser light, the focused light thereof is suitable.

In particular, when the light source is laser light of from 600 nm to 1500 nm, the light-heat conversion can be suitably carried out to form a clear color, whereby the level of the light energy and the shape or the laser beam spot can be identified. When a semiconductor laser is used as the light source for recording, an optimum colored image can be obtained by converting light emitted from the semiconductor laser into parallel light and focusing the parallel light to a spot having a diameter of from 1 to 100 μm by means of a focusing lens.

By placing the photosensitive coloring medium for use in this invention on a stage travelling at a definite speed and irradiating the medium with focused semiconductor laser light, the level of the light energy, the focusing extent of the focusing lens, and the confirmation of the optimum focus can be easily identified.

Furthermore, it is preferred that the heat-sensitive coloring material for use in this invention contains a basic colorless dye and an organic developer as described above. Such a photosensitive coloring medium is further described in detail.

As the heat-sensitive coloring material, a so-called dye series heat-sensitive coloring material composed of a colorless or light-colored basic dye and an organic developer for coloring the dye as coloring components is preferred in the points that various kinds of clear colors are obtained even in the case of irradiating with light of a low energy, the whiteness of the recording surface is high, and the colored state can be easily indentified.

Examples of the basic colorless dye which can be used in this invention are triphenylmethane series leuco dyes such as crystal violet lactone, etc., fluoran series leuco dyes such as 3-diethylamino-6-methyl-7-anilino-fluoran, etc., azaphthalide series leuco dyes such as 3-(4-diethylamino-2-ethoxyphenyl)-3-(1-ethyl-2-methylindol-3-yl)-4-azaphthalide, etc., and fluoreine series leuco dyes such as 3,6,6'-tris(dimethylamino)-spiro[fluoreine-9,3'-phthalide], etc.

Also, examples of the organic developer which can be used in this invention are bisphenol A(s), 4-hydroxybenzoic acid esters, 4-hydroxyphthalic acid diesters, phthalic acid monoesters, bis-(hydroxyphenyl)sulfides, 4-hydroxyphenylarylsulfones, 4-hydroxyphenylaryl sulfonates, 1,3-di[2-(hydroxyphenyl)-2-propyl]-benzenes, 4-hydroxybenzoyloxybenzoic acid esters, and bisphenolsulfones.

It is preferred that the basic colorless dye and the organic developer form a heat-sensitive coloring layer together with a binder, a sensitizer, a filler, a quality controlling agent, etc. For forming the heat-sensitive coloring layer, conventional techniques for obtaining heat-sensitive recording papers using heat-sensitive coloring materials can be applied or the method described in Japanese Patent Publication (unexamined) No. 272702/88 filed by the same applicant may be used.

As the binder, completely saponified polyvinyl alcohol having a polymerization degree of from 200 to 1900, denatured polyvinyl alcohols (such as amide-denatured polyvinyl alcohol, etc.), hydroxyethyl cellulose, a styrene-butadiene copolymer, etc., are used.

Also, as the sensitizer or the quality controlling agent, fatty acid amide, montan wax, etc., are used and as the filler, materials being usually used in the field of paper processing, such as clay, calcium carbonate, plastic pigments, etc., can be used.

In particular, hollow plastic pigments can be preferably used since they can reflect well near infrared light and when they are incorporated in the heat-retentive heat-sensitive coloring layer or a layer under the heat-sensitive coloring layer, the energy of irradiated light can be utilized with a good efficiency.

The compounding amounts and ratios of the basic colorless dye, the organic developer, the binder, the sensitizer, the filler, and, if desired, other components in the heat-sensitive coloring layer in this invention are determined according to the performance and recording aptitude required for the light sensor without particular restrictions.

However, it is suitable in this invention that the amounts of the organic developer, the sensitizer, and the filler are from 3 to 12 parts by weight, from 3 to 12 parts by weight, and from 1 to 20 parts by weight, respectively to one part by weight of the basic colorless dye and the amount of the binder is from 10 to 25 parts by weight to the total solid components of the heat-sensitive coloring layer. In addition, the aforesaid weight parts are the weight parts of solid components.

The heat-sensitive coloring layer in this invention can be formed as follows. That is, the basic colorless dye, the organic developer, and the sensitizer are finely granulated separately or as a mixture thereof if they can be mixed without causing trouble by means of a pluverizer such as a ball mill, an attritor, a sand grinder, etc., or a proper emulsifier to grain sizes of less than few microns and then a binder and, if necessary, the aforesaid various kinds of quality controlling agents are further added to the mixture to provide a coating composition. The coating composition is coated on a base material or, as the case may be, on a light-absorptive material layer already formed on a base material to form a heat-sensitive coloring layer.

Furthermore, a protective layer may be formed on the surface of the heat-sensitive coloring layer for reducing or inhibiting the occurrence of contamination from external environment, such as humidity, gases, water, solvents, oily substances, etc.

The protective layer is required to be transparent for visible light and to give no bad influences on the heat-sensitive coloring layer, and it is usually better to form the protective layer using one or more kinds of the binders used for the heat-sensitive coloring layer.

In this invention, the light-absorptive material and the heat-sensitive coloring material may be separately dispersed in each solvent and form triple layers of a light-absorptive material layer/a heat-sensitive coloring layer/a light-absorptive material layer on a base material as described above.

Also, the light-absorptive material is dispersed or dissolved in the heat-sensitive coloring material and a light-absorptive heat-sensitive coloring layer having both the functions of heat-sensitive coloring property and light-absorptive property may be formed.

In this invention, the aforesaid near infrared absorbent is preferably used as the light-absorptive material and for mixing it with the heat-sensitive coloring material, the near infrared absorbent may be simply mixed with necessary materials or it is more effective to previously melt-mix the near infrared absorbent with the aforesaid organic developer and/or sensitizer and disperse the molten mixture in the heat-sensitive coloring material.

Also, in the case of forming the light-absorptive material layer containing the near infrared absorbent on and/or under the heat-sensitive coloring layer, it is preferred to incorporate the near infrared absorbent in a protective layer formed on the heat-sensitive coloring layer for imparting a light-absorbing function to the protective layer.

The protective layer is formed on the heat-sensitive coloring material layer at from about 1 to 10 g/m². Also, the amount of the light-absorptive material which is used for the protective layer is at least 0.05% by weight of the amount of the binder for the protective layer. If the amount of the light-absorptive material is less than 0.05% by weight, sufficient heat is not generated. There is no particular upper limit in the amount thereof but in the case using a near infrared absorbent as the light-absorptive material, the upper limit thereof is usually 10% by weight for preventing coloring by the near infrared absorbent or generation of excessive heat, and also from the economical view point.

As the base material, a paper, a cloth, a nonwoven fabric, a woven cloth, a plastic sheet, a metal plate, etc., is used as described above.

As the light source the output energy, main wavelength, position, pattern, etc., of which is identified by the method of this invention, a light source emitting light having a near infrared wavelength region of from 700 nm to 2500 nm, such as a semiconductor laser, a diode pumping YAG laser, a xenon flash lamp, a quartz flash lamp, halogen lamp, etc., can be used selectively according to the intended purpose.

As the form of the photosensitive coloring medium being used as a light sensor in this invention, there are a card type medium having a business card size, a card type medium having scaled cross lines or standard circles with a definite interval printed thereon for easily determining the diameter and position of the beam irradiated or the detection of the position of the beam, a card type medium having plural light-absorptive material layers each having a different absorption wavelength for detecting light of a wide wavelength region by one light sensor card, a disk type medium for inspecting a write device of add-on type disk, etc.

By using the aforesaid photosensitive coloring medium, a write device using laser light can be instantly and accurately inspected, that is, the detection of laser light, the confirmation whether the optical axis is clogged or not, and the confirmation whether light is focused well or not can be instantly and accurately determined.

As described above, since in this invention, a photosensitive coloring medium (light sensor) having on a base material a layer containing the heat-sensitive coloring material and, laminated thereon, a layer containing the light-absorptive material, in particular, the near infrared absorbent, or a layer containing a mixture of the heat-sensitive coloring material and the light-absorptive material is used, when the light sensor is irradiated by light, in particular, semiconductor laser light of from 5 to 200 mW having the main wavelength at the region of from 600 nm to 1500 nm, the light energy is absorbed by the light-absorptive material to be converted into a heat energy and the sensitizer, the organic developer, and the basic colorless dye are successively dissolved, thereby coloring occurs. In this case, the colored extent differs according to the output energy, the main wavelength, etc., of light and hence by measuring the colored extent, the output energy, the main wavelength, the position, the pattern, etc., of the light can be identified.

In particular, when the method of this invention is used for the identification of near infrared light of a semiconductor laser, an electronic flash, etc., a clear image is obtained according to the intensity of the irradiated light and hence the intensity of laser light or flash light, which has never been determined by the naked eye can be easily determined.

Furthermore, in this invention, after safely and easily detecting the shape and the intensity of a laser spot, the recording image of the laser spot which can be used for comparing other spot images later is obtained. In particular, when a light-emitting element emits plural beams, the number, shapes, and intensities of these beams can be accurately identified.

Thus, whether the optical system are matched well or not can be accurately determined.

Also, since the photosensitive recording medium for use in this invention can be prepared using commercially available heat-sensitive recording papers largely appearing on market, the photosensitive recording medium is disposable and also good results are obtained for advancing the practice of a heat mode type photosensitive recording medium effectively utilizing semiconductor laser light having a near infrared wavelength as the light source.

The following examples are intended to illustrate the present invention but not to limit it in any way.

In the examples, all parts are by weight.

EXAMPLE 1

Coloring Layer

| Dispersion (A): (Dispersion of basic colorless dye) | |
|---|---|
| 3-Diethylamino-6-methyl-7-anilinofluran | 2.0 parts |
| Aqueous 10% polyvinyl alcohol solution | 3.4 parts |
| Water | 1.3 parts |
| Total | 6.7 parts |
| Dispersion (B): (Dispersion of Organic developer) | |
| Bisphenol A | 6.0 parts |
| p-Benzylbiphenyl | 4.0 parts |
| Aqueous 10% polyvinyl alcohol solution | 12.5 parts |
| water | 2.5 parts |
| Total | 25.0 parts |

Each of dispersion (A) and dispersion (B) was obtained by separately wet-grinding the aforesaid components for one hour in a test sand grinder.

Then, by mixing 6.67 parts of dispersion (A) (the dispersion of the basic colorless dye), 25 parts of dispersion (B) (the dispersion of the organic developer), 40 parts of a dispersion of 25% silica (p-527, trade name, made by Mizusawa Industrial Chemicals Ltd.), and 10 parts of an aqueous solution of 10% polyvinyl alcohol, a coating composition for a heat-sensitive coloring layer was obtained.

The aforesaid coating composition was coated on a wood free paper having a basis weight of 60 g/m$^2$ at a coverage of 4.0 g/m$^2$ using a Mayer bar and dried to provide a heat-sensitive coloring paper.

Light-Absorptive Protective Layer

| | |
|---|---|
| Indocyanine Green | 0.5 part |
| Aqueous 10% polyvinyl alcohol solution | 100 parts |
| Glyoxal (40%) | 5 parts |
| Total | 105.5 parts |

The aforesaid coating composition for a light-absorptive protective layer was coated on the heat-sensitive coloring paper obtained as described above at a coverage of 2.0 g/m$^2$ using a Mayer bar and dried to provide a photosensitive coloring medium as a light sensor having the protective layer.

The light sensor paper was irradiated by laser spot light from a laser head (LDC-8330-CINC, made by Applied Optics Co., center wavelength 830 nm, Output 30 mW) focused by a focusing lens. Thus, a clear black image was obtained on the light sensor paper at a position that the irradiated point was considered to be the focus, that is, the focused position of the light.

Also, the practically measured focal distance coincided with the focal distance thus identified.

Also, the focused beam of laser light having a wavelength of 830 nm could scarcely be identified by the naked eye but when the aforesaid light sensor paper was set at a position which was considered to be the focus position, a black image was instantly obtained, thereby the existence of the laser focused beam could be confirmed.

Furthermore, when the position of the light sensor paper was deviated from the focus position a little, the spot formed on the light sensor paper became larger and the density there became faint.

EXAMPLE 2

On the recording paper prepared as in Example 1 was formed an image having an absorption peak at 830 nm by means of a plotter (MP-3200-51, trade name, made by Graphtex Co.) using a plotter pen (the exclusive pen for MP-3200-51, made by Graphtex Co.) filled with a near infrared absorptive ink having the following composition.

Near Infrared Absorptive Ink

| | |
|---|---|
| Indocyanine Green (OCG) | 2 parts |
| Glycerol | 10 parts |
| Diethylene glycol monomethyl ether | 6 parts |
| Sodium dodecylbenzenesulfonate | 3 parts |
| Sodium dehydroacetate | 0.1 part |
| Water | 78.9 parts |
| Total | 100 parts |

As the result thereof, a very light green image was obtained. The image was irradiated with a laser spot light from a laser head (LDC-8330-CINC, trade name, made by Applied Optics Co., center wavelength 830 nm, output 30 nW) by a focusing lens. Thus, a clear black image was obtained on the light sensor paper at a point that the irradiated point was considered to be the focus, that is the focused position of the spot light. Also, the practically measured distance coincided with the focal distance.

Also, the focused beam of laser light having a wavelength of 830 nm scarcely identified by the naked eye but when the aforesaid light sensor paper was set at a position which was considered to be the focus, a black image was instantly obtained on the near infrared absorptive image thereon and the existence of the focused beam of laser light could be confirmed.

EXAMPLE 3

By following the same procedure as in Example 1 except that NK-2612 (trade name, made by Nippon Kanko Shikiso Kenkyusho K. K.) was used in place of Indocyanine Green in the near infrared absorptive ink, a clear black image was obtained on the surface of the heat-sensitive coloring layer and also the focal distance and the existence of the focused beam of laser light could be similarly confirmed. That is, the light sensor paper showed excellent functions as the light sensor paper of Example 1.

EXAMPLE 4

By following the same procedure as Example 2 while employing an ink jet system in place of the pen system for applying the near infrared absorptive ink, a near infrared absorptive image was formed and the image was irradiated by laser spot light focused by the focusing lens as in Example 2. Thus, clear black images were obtained on the surface of the heat-sensitive coloring layer along the near infrared absorptive image formed by the ink jet system and the focal distance and the existence of the focused beam of laser light could be confirmed. That is, the light sensor paper showed excellent functions as the light sensor paper of Example 1.

EXAMPLE 5

A light sensor paper was prepared as in Example 1 and the surface of the heat-sensitive coloring layer was irradiated by an electronic flash for camera, Auto 4330 (trade name, made by Sun Back Co.) While stopping down the lighting window to 5%. As the result thereof, a clear black image was instantly obtained on the surface of the light sensor paper, which showed that the light sensor paper had a sufficient function capable of evaluating the intensity of light having wavelengths of about 830 nm included in the electronic flash.

EXAMPLE 6

When the surface of a light sensor paper prepared as in Example 2 was overall irradiated by means of XENOFAX FX-180 (trade name, made by Riso Kagaku Kogyo K. K.), black images were instantly formed on the ink jet imaged portions. The result showed that the light sensor paper had a sufficient function capable of evaluating the intensity of light having wavelengths of about 830 nm included in an electronic flash.

EXAMPLE 7

A near infrared absorptive layer was printed on the surface of a heat-sensitive coloring layer formed as in Example 1 with a printing ink having the following composition by means of a Printing Bureau type gravure printing machine (made by Kumagaya Kiki K. K.) to provide a light sensor paper.

Near Infrared Absorptive Ink Composition for printing

| | |
|---|---|
| Phthalocyanine Green | 3.6 parts |
| Styrene-maleic acid copolymer | 127.5 parts |
| Isopropyl alcohol | 30 parts |
| Water | 96 parts |
| Clay | 9 parts |
| Surfinol | 1.5 parts |
| Total | 300 parts |

When the near infrared absorptive image surface of the light sensor was overall irradiated by means of XENOFAX FX-180 (trade name, made by Riso Kagaku Kogyo K. K.), clear black images were instantly obtained on the printed image portions. The result showed that the light sensor paper had a sufficient function capable of evaluating the intensity of light having wavelengths of about 830 nm included in an electronic flash.

EXAMPLE 8

A light-absorptive protective layer was formed on a dichromatic heat-sensitive recording paper having a red-coloring lower layer and a blue-coloring upper layer by the same manner as in Example 1 and dried to provide a two colors-sensitive type light sensor paper.

When the light sensor paper was irradiated by a focused laser spot as in Example 1, the portion irradiated by the center of the beam having a high light energy was colored in red and the peripheral portions were cocentrically colored in blue. Thus, the energy level of a focused laser spot could be more practically confirmed than the case of the monochromatic heat-sensitive recording paper.

As many apparently widely different embodiments of this invention may be made without departing from the spirit and scope thereof, it is to be understood that the invention is not limited to the specific embodiments thereof except as defined in the appended claims.

What is claimed is:

1. A method of identifying the output energy, main wavelength, position and pattern of near infrared laser light, which comprises (1) irradiating a photosensitive coloring medium comprising (a) a base material, (b) a heat sensitive coloring material containing a basic colorless dye and an organic developer, and (c) a light absorptive material releasing heat sufficient for coloring said heat sensitive coloring material by absorbing the light and having the maximum adsorption wavelength at the wavelength region of from 600 nm to 1500 nm, by the light with a wavelength of from 600 nm to 1500 nm, and (2) identifying the output energy, main wavelength, position and pattern of near infrared laser the light from the colored extent directly by naked eye.

2. The method of identifying the output energy, main wavelength, position and pattern, of the near infrared laser light as claimed in claim 1, wherein the heat-sensitive coloring material contains, a sensitizer, a filler, and a binder.

3. The method of identifying the output energy, main wavelength, position and pattern of the near infrared laser light as claimed in claim 1, wherein the light-absorptive material is dissolved or dispersed in an ink.

4. The method of identifying the output energy, main wavelength, position and pattern, of the near infrared laser light as claimed in claim 1, wherein the photosensitive coloring medium has a light-absorptive material layer, a heat-sensitive coloring material layer, and light-absorptive material layer on the base material in the order.

5. The method of identifying the output energy, main wavelength, position and pattern, of the near infrared laser light as claimed in claim 1, wherein the photosensitive coloring medium has on the surface a light-absorptive material layer having a reflectance in the range of from 20% to 80%.

6. The method of identifying the output energy, main wavelength, position and pattern, of the near infrared laser light as claimed in claim 1, wherein the photosensitive coloring medium is of a card form or of a disk form, or each having scale thereof or being writable.

* * * * *